(Model.)
J. E. FRAZEE.
Bee Hive.
No. 239,239. Patented March 22, 1881.
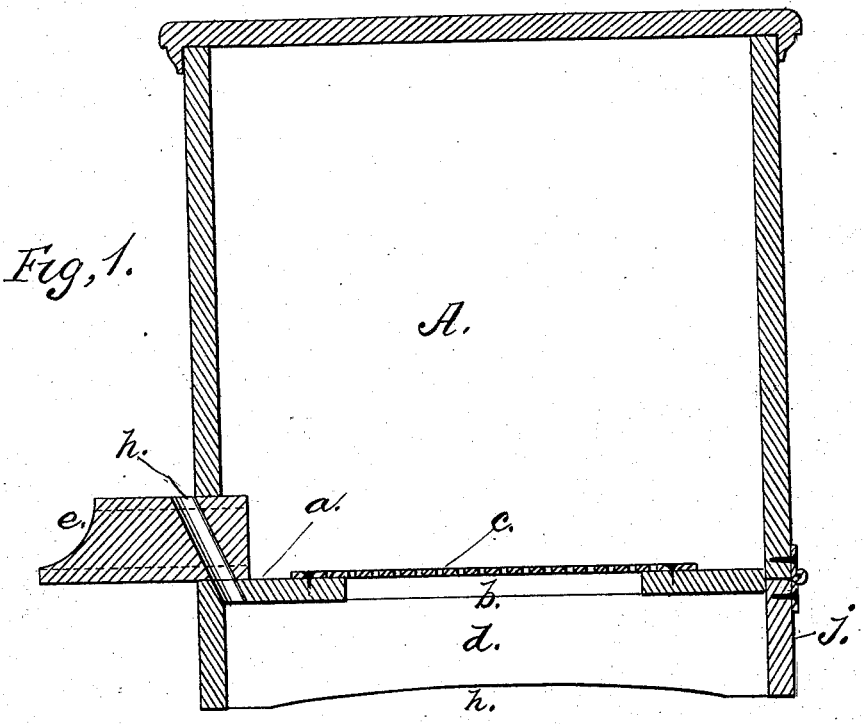
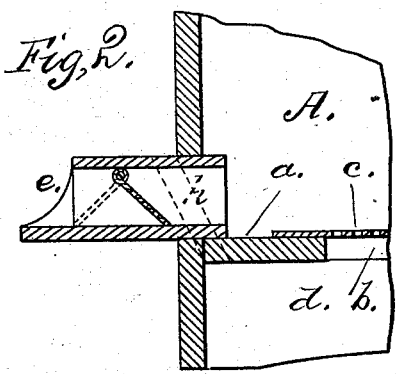
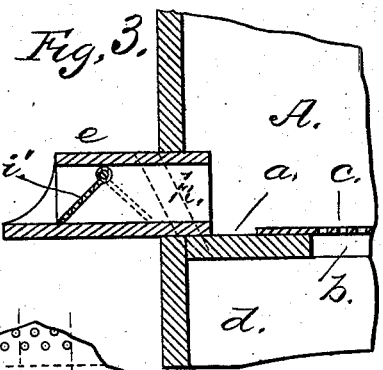
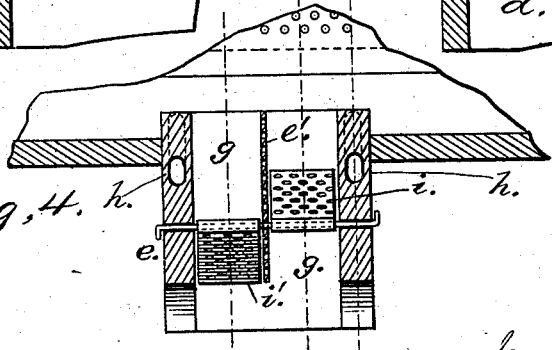
WITNESSES
Villette Anderson.
F. J. Masi.
INVENTOR
James E. Frazee.
by E. W. Anderson
his ATTORNEY
N. PETERS, PHOTO-LITHOGRAPHER, WASHINGTON, D. C.

UNITED STATES PATENT OFFICE.

JAMES E. FRAZEE, OF SAVANNAH, MISSOURI.

BEE-HIVE.

SPECIFICATION forming part of Letters Patent No. 239,239, dated March 22, 1881.

Application filed August 21, 1879.

*To all whom it may concern:*

Be it known that I, JAMES E. FRAZEE, of Savannah, in the county of Andrew and State of Missouri, have invented a new and valuable Improvement in Bee-Protectors; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my invention, and Figs. 2, 3, and 4 are detail sections of the same.

This invention has relation to improvements in means for protecting hives from the attacks of moths; and it consists in a hive-box constructed substantially in the manner and for the purposes substantially as hereinafter set forth.

In the annexed drawings, the letter A designates the storing-chamber of a hive, the same being usually of rectangular form, and being provided with a bottom, $a$, raised above the lower edges of the bottoms of the sides and ends, as shown in Fig. 1. The bottom $a$ is provided with an opening, $b$, covered with a reticulated material, $c$, below which is a chamber, $d$, having communication with the outside of the hive by means of notches, recesses, apertures, or hollows cut or formed in the lower edges of the sides and ends of the hive-box, as shown at $h$, Fig. 1. The bees have access to the interior of the hive through a rectangular passage, $e$, divided longitudinally into two passage-ways by a preferably reticulated partition, $e'$. One of these passage-ways has a reticulated door, $i$, opening inward and sufficiently light to be opened by the bees, and the other a similar door, $i'$, that opens outward and allows the bees to pass out of the hive. These doors are hinged to the top wall of passages $g$, and gravitate to the closed position, after the bees have passed under them, automatically. As shown in Fig. 4, the side walls of passage $e$ are made unusually thick, and through them are cut the oblique passage-ways $h$, leading from the top of tube $e$ into the chamber under the floor of the box, from which moths landing upon the projecting part of passage-tube will, attracted by the scent of bees, readily pass into the said passages into the chamber $d$, and thence into the open air. The rear part of chamber $d$ is closed by a hinged door, $j$, through which a bait of honey or other saccharine substance is introduced into it, and by means of which the accumulated captures of moths may be cleaned out. Usually, however, the scent of the honey passing down through the reticulated portion of the bottom of the store-chamber will be sufficient, without bait, to decoy the moth from the bee-entrance down into the chamber.

A detachable trap for drones and robber-bees, serving also as an entrance for the working bees, has been provided with hinged doors, which permitted the ingress of all of the bees to the trap, but permitted only the egress of the working bee beneath the said doors, which opened inwardly only. Inclined apertures for the moth-miller and drones have also been used in connection with such traps. I desire protection only for the construction hereinbefore described and hereinafter specifically claimed.

What I claim as new, and desire to secure by Letters Patent, is—

The combination, in a bee-hive having a storing-chamber, A, a moth-receptacle below the same, and a partly-reticulated bottom, $a$, between them, of the conduit $e$, having longitudinal partition $e'$, the gravitating doors $i$ $i'$ in the passage-ways thus formed, opening oppositely, and the moth-passages $h$, leading obliquely downward under the reticulated bottom from the top of said conduit $e$, through its end walls, into the moth-receptacle $d$, substantially as specified.

In testimony that I claim the above I have hereunto subscribed my name in the presence of two witnesses.

JAMES E. FRAZEE.

Witnesses:
C. HARTZELL,
JOHN HARTZELL.